ADDITION AND SUBTRACTION COMPUTER

Filed Dec. 24, 1964 3 Sheets-Sheet 1

INVENTORS
SHINICHIRO OGAWA
KEN SHIRAGAKI
BY
Arthur H. Swanson
ATTORNEY.

INVENTORS
SHINICHIRO OGAWA
KEN SHIRAGAKI
BY
Arthur H. Swanson
ATTORNEY.

ADDITION AND SUBTRACTION COMPUTER

Filed Dec. 24, 1964 3 Sheets-Sheet 3

INVENTORS
SHINICHIRO OGAWA
KEN SHIRAGAKI
BY
Arthur H. Swenson
ATTORNEY.

United States Patent Office 3,409,764
Patented Nov. 5, 1968

3,409,764

ADDITION AND SUBTRACTION COMPUTER

Shinichiro Ogawa, Tokyo, and Ken Shiragaki, Fujisawa-shi, Japan, assignors to Honeywell Inc., Minneapolis, Minn., a corporation of Delaware Filed Dec. 24, 1964, Ser. No. 420,915
Claims priority, application Japan, Jan. 16, 1964, 39/1,622
8 Claims. (Cl. 235—193)

ABSTRACT OF THE DISCLOSURE

There is provided an analog computing circuit utilizing a plurality of signal transmitters, a plurality of potentiometers connected in parallel to receive signals from the transmitters, and a summing circuit which operates upon the signals supplied by the potentiometers which potentiometers may be varied for selective control.

In many of the recently developed equipments used for process measurement, there is used a constant current source transmitter which converts an analogue measured value to direct constant current in the range from 4 to 20 ma. and transmits same to a utilization device. In the case of indicating, recording or controlling measured values at several places in the process by using a plurality of constant current source transmitters, it may be necessary to add or substract by multiplying the signal currents from each of the said plurality of constant current source transmitters.

In order to solve the above problem, there have been provided arithmetic units for operating upon signal currents for a plurality of constant source transmitters. Typically, the arithmetic unit may include, for example, a magnetic amplifier type unit, a beam arithmetic type unit, a direct current amplifier type unit comprising series-connected resistors, or the like. However it is difficult for these arithmetic units to define suitable coefficients to be multiplied. Moreover, some of these arithmetic units are seriously limited in the number of inputs which can be applied thereto.

It is an object of this invention to resolve the serious problem in the prior art and to provide an improved arithmetic unit for addition and substraction, which unit is able to define suitable coefficients to be multiplied and which is able to add and subtract inputs thereto without any limitation, even in the case of multi-input arithmetic operations.

Another object of this invention is to provide an arithmetic network which operates upon signals supplied by a plurality of transmitters.

Another object of this invention is to provide an arithmetic network having a plurality of elements for controlling the operation thereof.

Another object of this invention is to provide an arithmetic network having a single span adjustment for controlling a plurality of potentiometers.

The nature of this invention will be better understood from the following description of embodiments thereof when read in conjunction with the accompanying drawings, in which.

Figure 1:
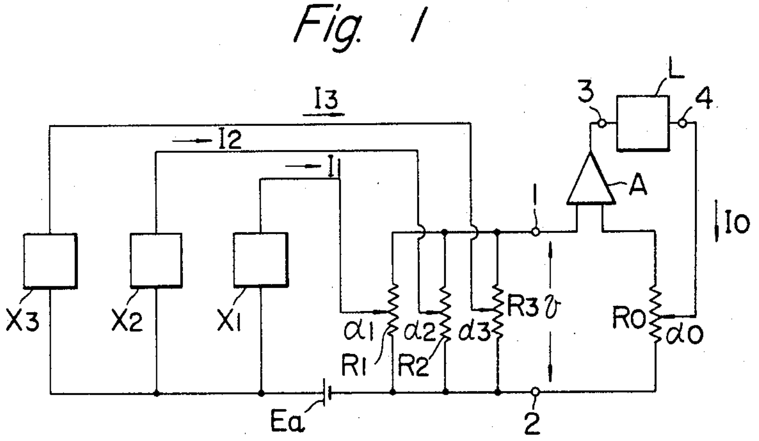
FIG. 1 is the principal circuit of an adder provided in accordance with this invention.

Referring to FIG. 1 there is shown a circuit comprising three constant current source transmitters, $X_1$, $X_2$ and $X_3$ respectively. The transmitters produce $I_1$, $I_2$ and $I_3$ signal currents, respectively. $R_1$, $R_2$ and $R_3$ are potentiometers which are connected in parallel to each other to constitute an arithmetic circuit. $\alpha_1$, $\alpha_2$ and $\alpha_3$ are coefficients to be multiplied by the signal currents $I_1$, $I_2$ and $I_3$ respectively. The coefficients are defined in proportion to the position of the collectors (variable taps) of potentiometers $R_1$, $R_2$ and $R_3$. $R_o$ is a potentiometer used for feed-back operation and $L_o$ is a coefficient which controls the feed back level. A is an amplifier, L is a load and $I_o$ is the output current. 1 and 2 are input terminals, while 3 and 4 are output terminals. Furthermore $E_a$ is a supply source of a transmitter.

In accordance with this invention, equivalent input resistor R and input voltage V (between terminals 1 and 2) can be obtained by the following equations:

$$R=1\bigg/\left(\frac{1}{R_1}+\frac{1}{R_2}+\frac{1}{R_3}\right) \tag{1}$$

$$V=(\alpha_1I_1+\alpha_2I_2+\alpha_3I_3)R \tag{2}$$

Supposing that amplifier A is a current feed-back amplifier, the input voltage V will be assumed to be.

$$V\cong\alpha_oR_oI_o$$

Consequently, Equations 3 and 4 are obtained.

$$\alpha_1I_1+\alpha_2I_2+\alpha_3I_3=\frac{R_o}{R}\alpha_oI_o \tag{3}$$

$$I_o=\frac{R(\alpha_1I_1+\alpha_2I_2+\alpha_3I_3)}{R_o\alpha_o} \tag{4}$$

According to Equation 4, the output signal current $I_o$ is proportional to the summation value of each multiplied value provided by multiplying coefficient $\alpha_1$, $\alpha_2$, and $\alpha_3$ by the input signal currents $I_1$, $I_2$ and $I_3$, respectively.

Figure 2:
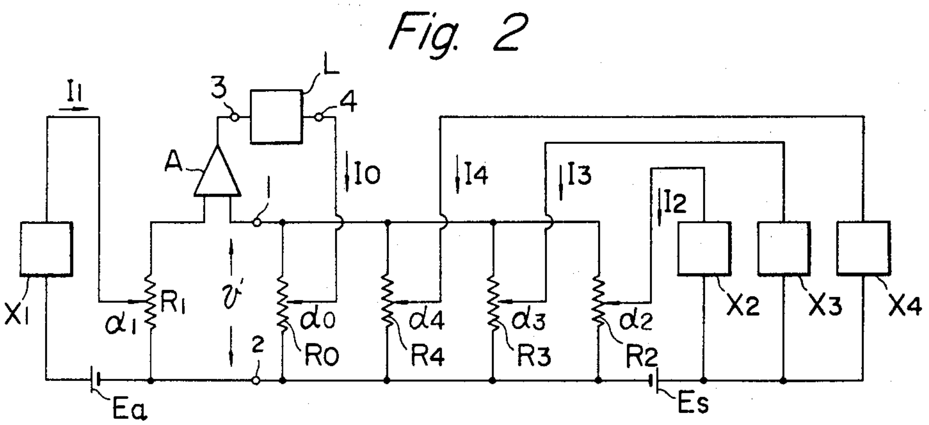
FIG. 2 is the principal circuit of a subtracter provided in accordance with this invention.

FIG. 2 is a principal circuit of a subtracter provided in accordance with this invention, which consists of three constant current source transmitters. More specifically, in FIG. 2, $E_a$ is a supply source for transmitter $X_1$, and $E_s$ is a supply source for transmitters $X_2$, $X_3$ and $X_4$. The other elements of the network shown in FIG. 2 are the same as those of the network shown in FIG. 1.

The equivalent feed-back resistor R' and the feed-back voltage V' are expressed by Equations 5 and 6, respectively.

$$R'=1\bigg/\left(\frac{1}{R_o}+\frac{1}{R_2}+\frac{1}{R_3}+\frac{1}{R_4}\right) \tag{5}$$

$$V'=(\alpha_oI_o+\alpha_2I_2+\alpha_3I_3+\alpha_4I_4)R' \tag{6}$$

On the other hand, the relation between the input voltage V and the feedback voltage V' is expressed by the equation $V=\alpha_1I_1R_1=V'$, so the Equation 6 can be rewritten in the following form shown in Equation 7

$$\alpha_oI_o=\frac{R_1}{R'}\alpha_1I_1-\alpha_2I_2-\alpha_3I_3-\alpha_4I_4 \tag{7}$$

In accordance with Equation 7, it should be noted that the output current $I_o$ is proportional to the value provided by subtracting input currents $I_2$, $I_3$ and $I_4$ from the input current $I_1$.

Referring to FIG. 1, if the constant current source transmitters $X_2$ and $X_3$ are connected with the polarity thereof reversed, the circuit can be used as the same subtracter as that of FIG. 2.

Figure 3:
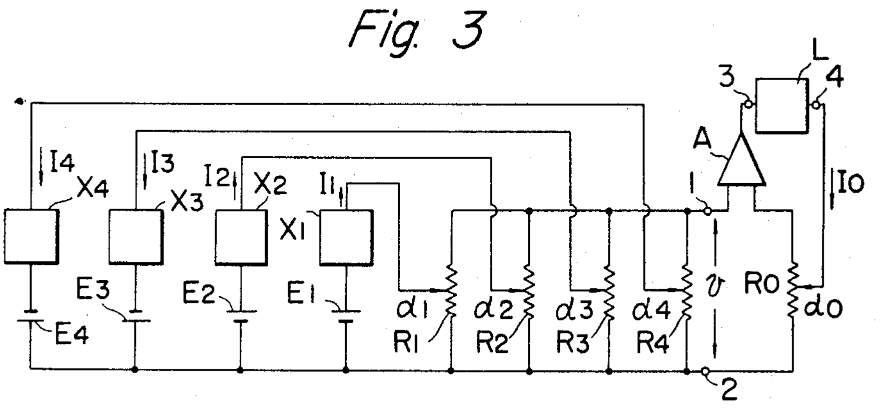
FIG. 3 is the principal circuit of a unit for addition and subtraction provided in accordance with this invention.

FIG. 3 shows a unit for addition and subtraction provided in accordance with this invention. More particularly, $X_1$, $X_2$, $X_3$ and $X_4$ indicate constant current source transmitters and $I_1$, $I_2$, $I_3$ and $I_4$ indicate signal currents thereof, respectively. $R_1$, $R_2$, $R_3$ and $R_4$ are potentiometers which are connected in parallel with each other. Each of the potentiometers receives a signal current from the constant current source transmitters $X_1$, $X_2$, $X_3$ and $X_4$ through the variable tap thereof, respectively. $\alpha_1$, $\alpha_2$, $\alpha_3$ and $\alpha_4$ are coefficients to be multiplied by the signal currents $I_1$, $I_2$, $I_3$ and $I_4$ respectively. $R_o$ is a feed-back potentiometer, A is an amplifier, and L is a load.

Each arrow indicates the direction of the signal current. Thus, constant current source transmitters $X_3$ and $X_4$ are connected in reverse direction to the constant current source transmitters $X_1$ and $X_2$. V is an input voltage of the amplifier and $I_o$ is an output current from the amplifier. $E_1$, $E_2$, $E_3$ and $E_4$ are supply sources for the transmitters $X_1$, $X_2$, $X_3$ and $X_4$, respectively and each of the sources produces the same voltage.

According to the unit for addition and subtraction shown in FIG. 3, the following equation showing output current $I_o$ can be obtained and thereby the circuit of FIG. 3 operates to accomplish the object of this invention.

$$I_o=\frac{R(\alpha_1 I_1+\alpha_2 I_2-\alpha_3 I_3-\alpha_4 I_4)}{R_o\alpha_o}$$

wherein $$R=1\bigg/\left(\frac{1}{R_1}+\frac{1}{R_2}+\frac{1}{R_3}+\frac{1}{R_4}\right)$$

As mentioned above, it is apparent that the unit for addition and subtraction provided in accordance with this invention is characterized by a plurality of constant current source transmitters and the same number of potentiometers connected in parallel with each other and to individually receive the signal currents from the transmitters.

Figure 4:
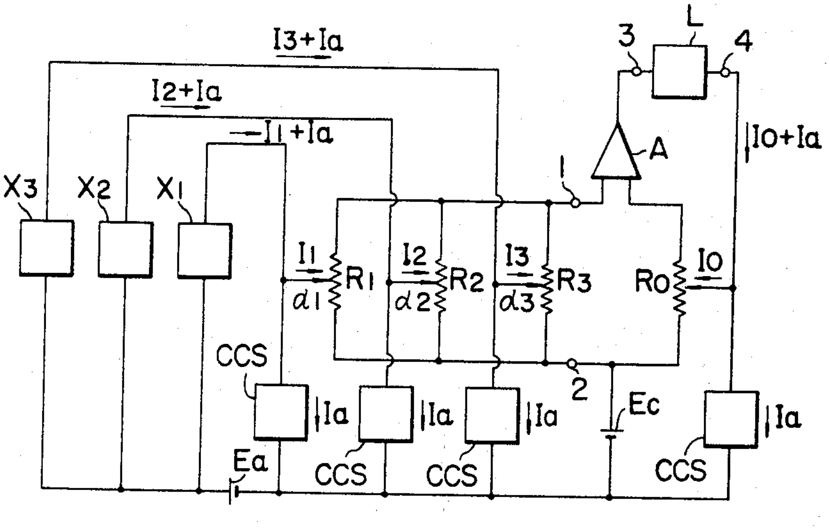
FIG. 4 is a circuit of an adder having live zero current.
Figure 5:
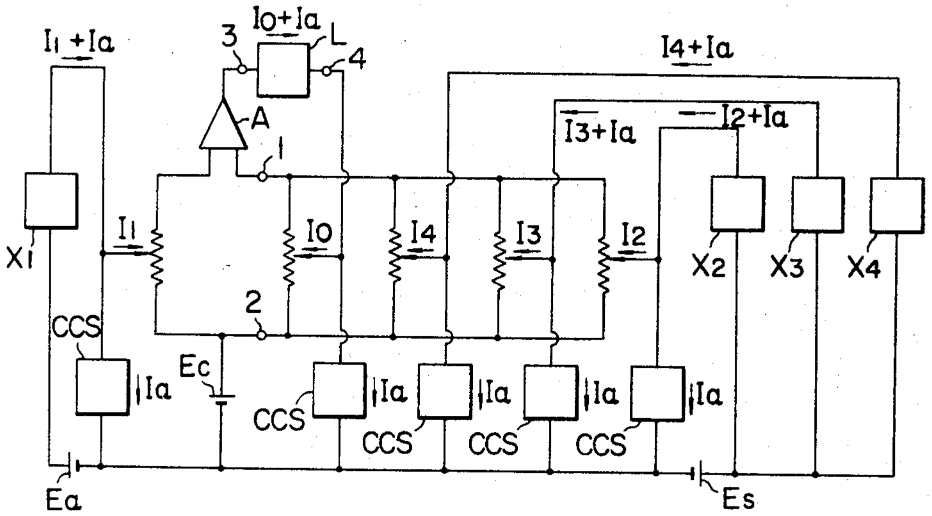
FIG. 5 is a circuit of a subtracter having live zero current.
Figure 6:
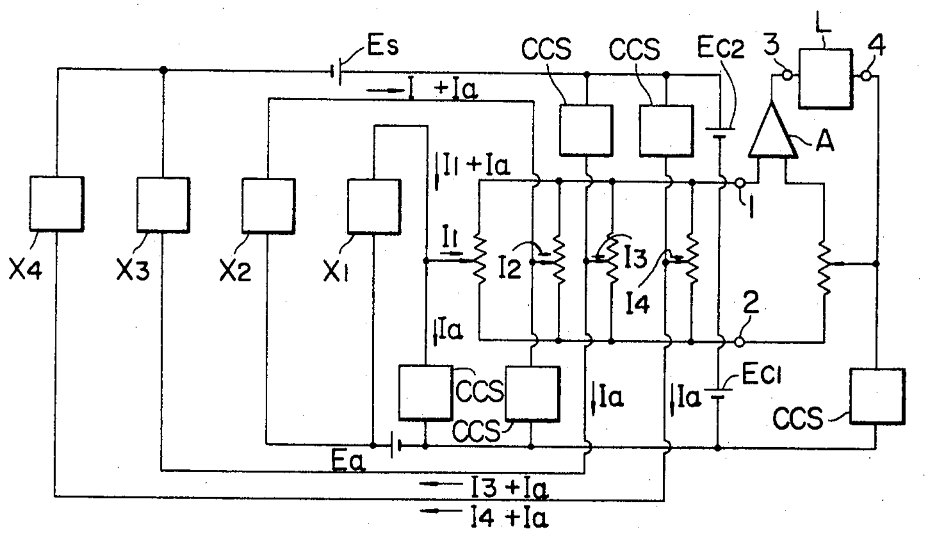
FIG. 6 is a circuit of an addition and subtraction unit having live zero current.

Frequently, the signal current from the constant current source transmitter contains "live zero" current. In this case, it is desirable to remove the live zero current from the signal current prior to addition and subtraction processing. FIG. 4, FIG. 5 and FIG. 6 show arithmetic circuit diagrams for the signal current containing the live zero current.

In FIG. 4, FIG. 5 and FIG. 6, each of the constant current sources CCS are individually connected in series to the constant current source transmitters $X_1$, $X_2$, $X_3$ and $X_4$ (where appropriate) and to the load L, respectively. Each of the constant current sources CCS supplies the live zero current $I_a$ which has an opposite direction relative to the signal current of each of the transmitters $X_1$, $X_2$, $X_3$ and $X_4$ or the load L, whereby the current which is supplied to the potentiometers $R_1$, $R_2$, $R_3$ and $R_4$ or $R_o$ is maintained at the same level as that of the current obtained by the circuit shown in FIG. 1, FIG. 2 or FIG. 3. That is, the signal supplied by the transmitter varies between 4 and 20 milliamperes. In some instances, it is desirable to have no current, i.e. 0 milliamps, supplied to the potentiometer. Therefore, the live zero current $I_a$, is applied to the potentiometer of variable tap in a manner to offset or nullify the lower current limit supplied to the transmitter. This arrangement permits the transmitter to supply an absolute signal to indicate a "0" signal in order to obtain greater accuracy at the "0" level. The other construction and operation of FIGS. 4, 5 and 6 are entirely the same as those of FIG. 1, FIG. 2 or FIG. 3 to accomplish the object of this invention. Thus, a sum or difference of signals supplied to amplifier A is computed as shown supra. The current $I_a$ associated with output current $I_o$ is, of course, a similar offset current so that the output current is a true indication of the signals applied to the network.

Figure 7:
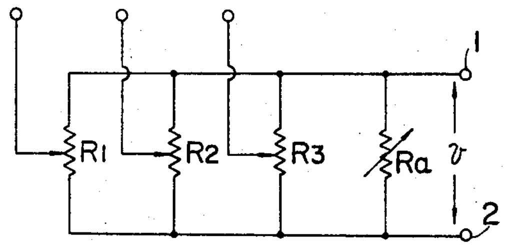
FIG. 7 is an embodiment of a span regulator.

FIG. 7 shows a circuit including a variable resistor $R_a$ for span adjustment, said variable resistor $R_a$ being connected in parallel to the potentiometers $R_1$, $R_2$ and $R_3$. Resistors $R_1$, $R_2$ and $R_3$ correspond to resistors shown in the preceding figures. According to this circuit, it is possible to adjust the resultant resistance to a desirable value without regard to unequal values of resistance of the potentiometers, so that only one resistor for span adjustment will be enough to adjust the resultant resistance.

Figure 8:
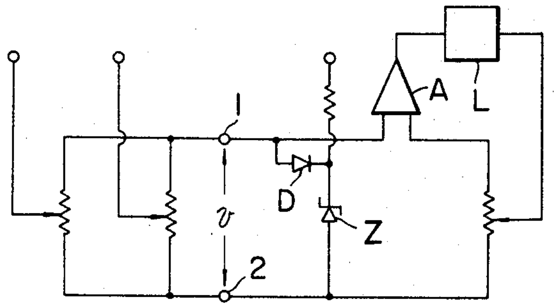
FIG. 8 is a unit having a limit circuit provided in accordance with this invention.

Referring to FIG. 8, there is shown a circuit which is used in case of undesirable results which may occur in the amplifier A because of an extreme increment of the input voltage V, or in the situation wherein it is desirable to limit the input voltage V to a constant level. Such a limiter as shown in FIG. 8 can be provided by connecting a rectifier diode D and a Zener diode Z in series across the input terminals 1 and 2 for the input voltage V and by supplying a positive voltage to the connection point of the cathodes of the rectifier diode D and the Zener diode Z.

In the embodiments shown in FIGURES 1 through 6, each output is a current signal, but it is easily appreciated that each output may be a voltage signal by using impedance conversion at the output terminals of the arithmetic amplifier.

The arithmetic unit for addition and subtraction provided in accordance with this invention results in many technical merits. For example, an adding or subtracting network operates upon the signals supplied by a plurality of transmitters. The signals provided by the network are controlled as to magnitude and the like by means of simple control elements. Moreover, a suitable offset signal is supplied in the event that greater accuracy at the zero range is desired.

A preferred embodiment is described. Any modifications to this concept which may be developed are meant to be included within the description so long as the inventive concept pervades.

What is claimed is:

1. An arithmetic unit for addition and subtraction comprising: plural constant current source transmitters; plural potentiometers connected in parallel to each other to receive, as inputs, signal currents from the individual transmitters; an arithmetic circuit able to define coefficients for the signal currents in any magnitude by adjusting the potentiometers; and a feed-back amplifier receiving, as an input, an output from the arithmetic circuit.

2. An arithmetic unit for addition and subtraction comprising: plural constant current source transmitters; plural potentiometers connected in parallel to each other to receive signal currents from the transmitters; an adding and subtracting circuit providing coefficients for the signal currents in any magnitude by adjusting the potentiometers; one variable resistor for span adjustment connected in parallel with the adding and subtracting circuit and a negative feed-back amplifier receiving an output from the adding and subtracting circuit.

3. The combination comprising, a plurality of signal sources, a plurality of variable impedance means, said impedance means connected in parallel with each other, each of said signal sources individually connected to a separate one of said impedance means, summing means connected to said impedance means to operate upon the signal produced thereacross by said sources, and output means connected to said summing means.

4. The combination recited in claim 3 wherein said output means includes variable impedance means connected between said parallel connected impedance means and said summing means.

5. The combination recited in claim 3 including a plurality of live zero current sources, each of said live zero current sources individually associated with a separate one of said signal sources.

6. The combination recited in claim 3 including further variable impedance means connected in parallel with the parallel connected plurality of variable impedances, said further variable impedance means thereby providing a span adjustment relative to the equivalent impedance of the parallel combination of impedances.

7. The combination recited in claim 3 including signal limiting means connected to said summing means.

8. The combination recited in claim 3 wherein said signal limiting means comprises rectifier diode means and Zener diode means connected in series with each other across the parallel combination of variable impedances, and source means connected to the junction between the respective diode means.

References Cited

UNITED STATES PATENTS

| | | | |
|---|---|---|---|
| 2,839,744 | 6/1958 | Slocomb | 340—347 |
| 2,915,246 | 12/1959 | Piety | 235—181 X |
| 3,142,750 | 7/1964 | Silverman et al. | 235—184 |
| 3,242,326 | 3/1966 | Cox | 235—181 |

MALCOLM A. MORRISON, *Primary Examiner.*

J. F. RUGGIERO, *Assistant Examiner.*